(12) United States Patent
Sakoske et al.

(10) Patent No.: US 11,174,170 B2
(45) Date of Patent: Nov. 16, 2021

(54) MODIFIED BLACK SPINEL PIGMENTS FOR GLASS AND CERAMIC ENAMEL APPLICATIONS

(71) Applicant: Ferro Corporation, Mayfield Heights, OH (US)

(72) Inventors: George E. Sakoske, Independence, OH (US); John J. Maloney, Solon, OH (US); Cody Gleason, Solon, OH (US); Srinivasan Sridharan, Strongsville, OH (US)

(73) Assignee: Ferro Corporation, Mayfield Heights, OH (US)

( * ) Notice: Subject to any disclaimer, the term of this patent is extended or adjusted under 35 U.S.C. 154(b) by 696 days.

(21) Appl. No.: 16/071,629

(22) PCT Filed: Jan. 23, 2017

(86) PCT No.: PCT/US2017/014519
§ 371 (c)(1),
(2) Date: Jul. 20, 2018

(87) PCT Pub. No.: WO2017/127788
PCT Pub. Date: Jul. 27, 2017

(65) Prior Publication Data
US 2021/0198119 A1 Jul. 1, 2021

Related U.S. Application Data

(60) Provisional application No. 62/281,207, filed on Jan. 21, 2016.

(51) Int. Cl.
*C01G 37/00* (2006.01)
*C03C 8/00* (2006.01)
(Continued)

(52) U.S. Cl.
CPC ......... *C01G 37/14* (2013.01); *C01G 45/1207* (2013.01); *C01G 49/0072* (2013.01);
(Continued)

(58) Field of Classification Search
CPC .... C01G 3/006; C01G 37/006; C01G 45/006; C01G 45/12; C03C 8/14; C09C 1/346
See application file for complete search history.

(56) References Cited

U.S. PATENT DOCUMENTS 2,309,173 A  1/1943 Diehl
3,528,839 A  9/1970 Weber
(Continued)

FOREIGN PATENT DOCUMENTS

CN  103274761 B  8/2014

OTHER PUBLICATIONS

International Search Report for corresponding PCT/US2017/014519 dated Jun. 8, 2017, one page.
(Continued)

*Primary Examiner* — Mark Kopec
(74) *Attorney, Agent, or Firm* — Rankin, Hill & Clark LLP; Christopher Jan Korff

(57) ABSTRACT

Modified copper chromite spinel pigments exhibit lower coefficients of thermal expansion than unmodified structures. Three methods exist to modify the pigments: (1) the incorporation of secondary modifiers into the pigment core composition, (2) control of the pigment firing profile, including both the temperature and the soak time, and (3) control of the pigment core composition.

18 Claims, 1 Drawing Sheet

(51) Int. Cl.

| | |
|---|---|
| *C09C 1/00* | (2006.01) |
| *C01G 37/14* | (2006.01) |
| *C09D 7/61* | (2018.01) |
| *C01G 45/12* | (2006.01) |
| *C01G 49/00* | (2006.01) |
| *C03C 1/04* | (2006.01) |
| *C03C 8/14* | (2006.01) |
| *C09C 1/34* | (2006.01) |
| *C09C 1/40* | (2006.01) |
| *C09C 3/04* | (2006.01) |

(52) U.S. Cl.
CPC .............. *C03C 1/04* (2013.01); *C03C 8/14* (2013.01); *C09C 1/346* (2013.01); *C09C 1/407* (2013.01); *C09C 3/043* (2013.01); *C09D 7/61* (2018.01); *C01P 2002/32* (2013.01); *C01P 2002/50* (2013.01); *C01P 2002/72* (2013.01); *C01P 2006/32* (2013.01); *C03C 2207/00* (2013.01)

(56) References Cited

U.S. PATENT DOCUMENTS

| | | | |
|---|---|---|---|
| 4,074,010 A | 2/1978 | Knight | |
| 4,075,029 A | 2/1978 | Nuss | |
| 4,202,702 A | 5/1980 | Nuss | |
| 4,205,996 A | 6/1980 | Eppler | |
| 4,696,700 A | 9/1987 | Fischer et al. | |
| 5,080,718 A | 1/1992 | Sullivan et al. | |
| 5,194,089 A | 3/1993 | Speer et al. | |
| 5,250,112 A | 10/1993 | Wussow et al. | |
| 5,814,434 A | 9/1998 | Nakamura et al. | |
| 6,027,246 A | 2/2000 | Rosen et al. | |
| 6,080,232 A | 6/2000 | Sperlich et al. | |
| 6,416,868 B1 | 7/2002 | Sullivan et al. | |
| 6,582,814 B2 | 6/2003 | Swiler et al. | |
| 6,780,555 B2 | 8/2004 | Uchida et al. | |
| 7,737,062 B2 | 6/2010 | Sakoske et al. | |
| 8,172,935 B2 | 5/2012 | Swiler et al. | |
| 9,115,262 B2 | 8/2015 | Harada et al. | |
| 9,228,098 B2 | 1/2016 | Eron | |
| 2014/0057112 A1* | 2/2014 | Lang | C01G 25/006 428/402 |

OTHER PUBLICATIONS

Verification by Experiment, Feb. 25, 2019, pp. 8-10.

CPMA Classification and Chemical Descriptions of the Complex Inorganic Color Pigments, Fourth Edition, Jan. 2013 Update, Color Pigments Manufacturers Association, Inc., ten pages.

Moureen C. Kemei et al., "Structural ground states of (A,A')Cr2O4(A= Mg, Zn; A'=Co3 Cu) spinel solid solutions: Spin-Jahn-Teller and Jahn-Teller effects," Physical Review B 89, 2014 American Physical Society, pp. 174410-1-174410-15.

Third party observations for EP application EP3362415A1 based on application No. EP17742090 8 pursuant to Article 115EPC, seven pages.

M. Tovar et al., "Structural and magnetic properties of Cu—Ni—Cr spinel oxides," Physica B 385-386, 2006, pp. 196-198.

P.M. Randiwe et al., "Synthesis and physico-chemical study of a new quaternary oxide Al2Cr2Cu2O8," Materials Letters 32 (1997) pp. 175-178.

European Search Report for corresponding Application No. 17742090.8 dated May 29, 2019, 12 pages.

Xiaofei et al. "Investigation of Cu-Based Catalyst for Direct Synthesis of Ethyl Acetate from Ethanol: Improvement of Thermal Stability of Cu—Cr—Zr Composite Oxide Catalyst by Addition of Mn Promoter," Industrial & Engineering Chemistry Research, 2012, pp. 8974-8978.

Castiglioni et al. "Synthesis and Properties of Spinel-Type Co—Cu—Mg—Zn—Cr Mixed Oxides," Journal of Solid State Chemistry 152 (2000) pp. 526-532.

Chen, "Study on preparing low-cost cobalt free black ceramic pigments", Engineering Science and Technology Series 1, Issue 4, Apr. 15, 2011, (May 19, 2010); translation of pp. 21-24, and English Abstract.

* cited by examiner

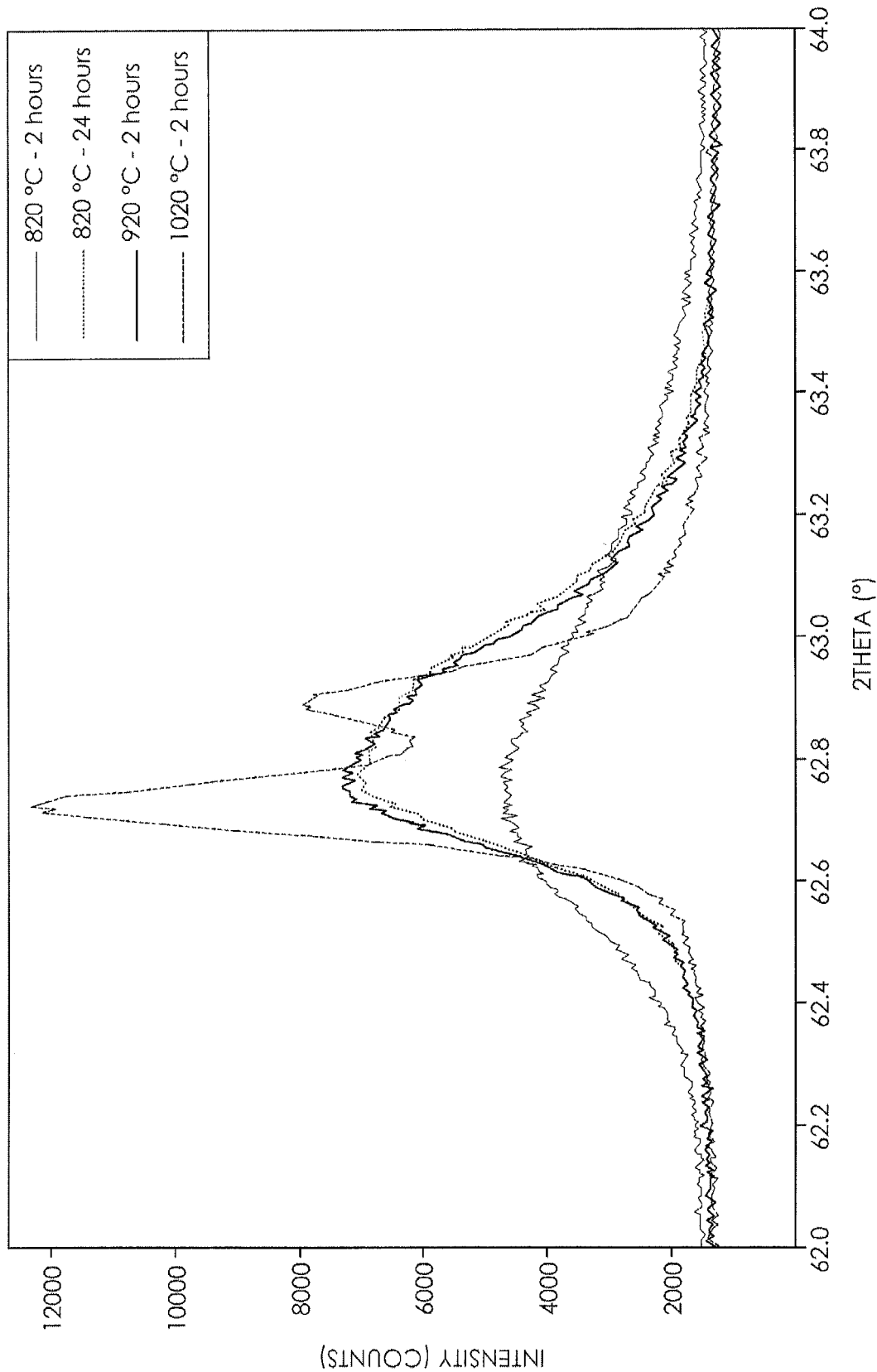

MODIFIED BLACK SPINEL PIGMENTS FOR GLASS AND CERAMIC ENAMEL APPLICATIONS

BACKGROUND OF THE INVENTION

1. Field of Invention

The subject disclosure generally relates to pigment compositions and method of making pigment compositions.

This invention relates to modified copper chromite black pigment having a lower CTE and/or darker black color than known copper chromite pigments. A copper chromite crystal structure is modified by addition of one or more elemental oxides.

2. Description of Related Art

Pigments are widely used in various applications such as paints, inks, plastics, rubbers, ceramics, enamels, and glasses. There are various reasons for using inorganic pigments. Among these are the coloristic properties of the pigments, their visible as well as ultraviolet (UV) and infrared (IR) reflectance characteristics, their light fastness and their high temperature stability. The high temperature stability is necessary when the objects being colored are produced at elevated temperatures.

Pigments exhibit certain colors because they selectively reflect and absorb certain wavelengths of light. White light is an approximately equal mixture of the entire visible spectrum of light. When white light encounters a colored pigment, some wavelengths are absorbed as they interact with the electronic structure of the pigment. These interactions are determined by the chemistry and crystal structure of the pigment. The wavelengths not absorbed are reflected back to the observer, and this reflected visible light spectrum creates the appearance of a color.

The appearance of pigments is also dependent upon the spectrum of the source light. Sunlight has a high color temperature and a fairly uniform spectrum, and is considered a standard for white light. Artificial light sources, including fluorescent light, tend to have great peaks in some regions of their spectrum, and deep valleys in other regions. Viewed under these conditions, pigments may exhibit different colors.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Black pigments are very important for enamel applications, including decorative and functional applications on automotive, architectural, appliance, and container glass substrates, as well as for sealing and electronic glass applications. Probably the most important application is glass enamel compositions that fuse at relatively low temperatures, for example, to form opaque dark-colored enamel bands on the outer edges of sections of automotive glass such as windshields and side and rear windows. These opaque dark-colored enamel bands, which typically vary in width from about 1.5 cm to about 15 cm, greatly enhance the aesthetic appearance of the sections of glass upon which they are applied and also block the transmission of sunlight through the glass to protect underlying adhesives from degradation by ultraviolet radiation. Without adequate protection from the UV in the solar radiation, the adhesives would prematurely degrade. Moreover, these opaque colored enamel bands preferably have the ability to conceal silver-containing buss bars and wiring connections of rear glass defrosting systems from view from the outside of the vehicle.

Spinel is a common pigment structure, with the general formula $AB_2X_4$, where X is commonly $O^{2-}$ or $F^-$, which have nearly identical ionic radii. The A and B represent the tetrahedral and octahedral sites in the normal spinel lattice. The spinel structure can be formed from many different elements, including any of the first row transition elements, and therefore is the structure of many inorganic pigments. While many of the spinel compounds have cubic space groups, distorted spinel structures can take on tetragonal and occasionally orthorhombic phases.

C.I. Black 28 pigments are the copper chromite black spinels, general formula $CuCr_2O_4$, but with Fe and Mn as allowable modifiers. Related pigments include the $(Cu,Fe,Cr)_3O_4$ compositional space, and the $(Cu,Mn,Cr)_3O_4$ compositional space. However, the composition of the pigment is not the only factor affecting the performance value of the pigment in various applications. Particle size distributions, specific surface areas, the number of phases, particle homogeneity, and lattice site occupancies all play key roles in the performance of the pigment. Therefore, the raw material sources, synthesis technique and conditions, and the post fire processing can be critical to the performance of the pigment.

Black 28 pigments are the most common black pigments used for glass enamel applications. Originally, an approximately stoichiometric $CuCr_2O_4$ formula such as K393-2 (Ferro Corp.) was used, and later some $MnO_x$-containing formulas have been used such as P9-51 (Asahi). These pigments form spinel structures, a tetragonal phase in the case of $CuCr_2O_4$, and either a tetragonal phase, a cubic phase, or a mixture of tetragonal and cubic $(Cu,Mn,Cr)_3O_4$ in the case of the $MnO_x$-containing formulas, depending primarily on the Mn level. Higher levels of Mn favor a larger fraction of cubic phase.

The structure of $CuCr_2O_4$ is reportedly cubic at 580° C. The inventors have determined that $CuCr_2O_4$ in an enamel converts from tetragonal to cubic by 600° C. and that it reverts to the tetragonal phase upon cooling. Since the cubic phase has a 1% lower density than the tetragonal phase, these phase transitions are believed to impact stress build up at the enamel-substrate and glass enamel frit—pigment particle interfaces. Therefore, a composition providing pure cubic phase at room temperature (i.e., temperature stabilized) is believed to be advantageous for reducing or minimizing stress build up. The pigments of the invention, and the pigments made by the methods of the invention, have a cubic structure at room temperature, after any necessary cooling or temperature stabilization.

Studying the structures of a variety of copper chromite based solid solutions, the inventors found that some cubic spinel compounds yielded reduced coefficients of thermal expansion (CTEs) when made into glass enamel expansion bars as compared to the commercially available standard pigment products. Since thermal expansion mismatch between enamel and substrate is a critical factor affecting stress and fractures at the interface, with the glass enamel typically having the higher CTE, this was considered to be an important discovery to reduce these factors. Past work based on the approach of reducing the CTE of the glass powder typically results in enamels needing higher fusion temperatures, and therefore becomes a tradeoff between interfacial stress and fusion temperature. Higher fusion temperatures can also reduce the temper in the substrate glass, as well as affect the flow and shape of the glass substrate.

The inventors have identified to make novel and modified Black 28 pigments that yield glass enamel expansion bars with reduced CTE values. These three methods are (1) the incorporation of secondary modifiers (partial substitutions into the CuMnCr core composition), (2) control of the pigment firing profile, including both the temperature and the soak time, and (3) control of the CuMnCr core composition.

Accordingly, improvements of black pigments for use in enamels are needed.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention can be employed. Other objects, advantages and novel features of the invention will become apparent from the following detailed description of the invention when considered in conjunction with the drawings.

BRIEF DESCRIPTION OF THE DRAWINGS

The FIGURE shows XRD peak width correlated with the CTE data for various CuMnCr oxide synthesis conditions.

DETAILED DESCRIPTION OF THE INVENTION

The inventors herein have discovered that a black pigment with a reduced CTE can be obtained by modifying the composition or structure of a standard copper chromite pigment, Cl Pigment Black28.

The general formula of the modified spinel pigment is $A_aCu_bMn_cCr_dO_4$, where A is a secondary modifier, and where a+b+c+d is approximately 3, and where the cations assume common valence states that leave the formula approximately uncharged. Mn tends to give mixtures of +2, +3, and +4 valence states in solid state structures, giving flexibility to the formulas with respect to levels of metal cations such as Al, Mg, Zn, Ti, Co, and Ni. Relative to the $Cu_xMn_yCr_zO_4$ matrix, the use of secondary modifiers, including Mg, Fe, Zn, Al, and Sb, have resulted in reduced CTEs when fired at 820° C. and tested in pigmented enamel expansion bars. It is also anticipated that CTE reductions to CuMnCr matrices will be afforded by incorporation of one or more of the following metal oxides: Sc, Ti, V, Co, Ni, Ca, Zr, Hf, Nb, Ta, Ga, In, Ge, Se, Te, Mo, and W.

The spinel structure is quite stable and typically exists even if the ratio of the elements does not exactly fit the theoretical $AB_2O_4$ composition. In the case where a+b+c+d≠3.0, the spinel structure and electroneutrality can be preserved by creating cation or anion vacancies. The inventors have noted that spinels can be stable even in the case of significant levels of cation vacancies, such as maghemite, which is cubic $Fe_2O_3$ having a structural formula of $Fe_{2.67}Vac_{0.33}O_4$, where Vac is a cation vacancy in the spinel structure. Hence, strict stoichiometry is not necessary. These vacancies may influence the color of the spinel.

Three methods have been identified to make Black 28 pigments that yield glass enamel expansion bars with reduced CTE values. These three methods are (1) the incorporation of secondary modifiers (partial substitutions into the CuMnCr core composition), (2) control of the pigment firing profile, including both the temperature and the soak time, and (3) control of the CuMnCr core composition.

The use of secondary modifiers was the first method found, with the discovery of the lower enamel CTEs using the compounds given in Table 1. Measurements of their extrapolated CTEs are compared to reference pigment K393-2. The extrapolated CTEs are an approximation to the CTE of the pigment itself. They were determined by measuring the CTEs of annealed enamel expansion bars at different pigment levels, and extrapolating the least squares line to the 100% pigment level. These compounds were fired under typical conditions for forming $CuCr_2O_4$ pigments, including K393-2, and then jet milled to reduce the size to approximately 1 micrometer (micron). The trials with the secondary modifiers clearly yielded significantly reduced extrapolated CTE values.

Glass enamels are used for a variety of decorative and functional applications, including automotive, architectural, appliance, and container glass, as well as display, sealing and electronic glass applications. These enamels are composites typically consisting of glass powders (frits), and one or more of pigments, modifiers, fillers, and other additives. The enamels are typically dispersed in an organic-based vehicle/medium to produce a paste or hot melt system that can be applied to a substrate by any of a variety of techniques, including screen printing, spraying, and pad transfer. The deposited material can optionally be dried before being fired to form a coating or sealing enamel of a continuous glass matrix phase. Embodiments of the invention include enamel compositions including any pigment disclosed herein or any pigment made by any method disclosed herein. Such pigments and enamels are suitable for the applications listed in the first sentence of this paragraph.

The pigments of the present invention (and reference pigments) were primarily tested in enamels consisting of frit E-8039, a powdered, Bi2O3-containing glass. The physical properties of this glass largely determine the enamel firing conditions and the enamel's CTE value. It should be appreciated that similar CTE reductions are to be expected with enamels based on other glass systems, including alkali borosilicates, ZnBi borates, lead borates, and lead silicates. Note that each of these broad glass categories may contain significant levels of other components. For example, alkali borosilicates often contain alumina and zinc oxide. Therefore, this invention is generally applicable to all glass-based enamel systems.

The pigment loading of glass enamels can vary widely depending upon the frit's density, the application's film thickness, and the function and desired appearance of the enamel. By utilizing volume percent (V %) compositions, a more normalized loading level can be established that will remove the dependency on the density of the frit(s). In the case of automotive window applications, the pigment loading is typically minimized to enable better enamel firing conditions and to provide better enameled substrate properties, but has to be at a level adequate to provide the desired appearance properties and UV-screening effects. For automotive window enamels, the pigment loading is typically in the range of 5-30V %, preferably 10-25V %, and most preferably 15-25V % (based on the inorganic components), with the balance consisting of frit, modifiers, and other additives.

Item 1. Accordingly, an embodiment of the invention is a modified copper chromite black spinel having a formula $A_aCu_bMn_cCr_dO_4$, wherein A is at least one metal selected from the group consisting of Al, Mg, Zn, Ti, Co, Ni, Sb, and Ca, and wherein $c≥0$, and wherein $2.6≤a+b+c+d≤3.2$.

Item 2. The modified pigment of item 1, wherein the modified pigment exhibits a reduced extrapolated CTE relative to $Cu_xMn_yCr_zO_4$ where $x+y+z=3$.

Item 3: The modified manganese copper chromite black spinel of item 1, wherein $b≤0.5$.

Item 4: The modified manganese copper chromite black spinel of Item 1, wherein $0.3≤b≤0.5$.

Item 5: A glass or ceramic substrate bearing an enamel comprising the modified copper chromite black spinel of any of items 1-4.

Item 6: A method of producing a manganese copper chromite based pigment comprising:
  providing precursor materials, such that when mixed and fired, form a modified copper chromite spinel structure,
  providing at least one of oxides, carbonates, nitrates, hydrates, sulfates, sulfides, fluorides or other suitable sources of oxides of at least one metal desired to modify the copper chromite spinel structure, the metals selected from the group consisting of Mg, Fe, Zn, Al, Sb, and Ca,
  either
    firing at a temperature of at least 850° C. for at least 2 hours—or—
    firing at a temperature of at least 920° C. for at least 1 hour—or—
    firing at a temperature of at least 1000° C. for at least 30 minutes
  wherein the CTE of the pigment is less than it would be firing at 820° C. with a 2 hour soak.

In item 6, and where it appears elsewhere herein, "at least 850° C." may be limited to an upper limit of 919° C. or such other temperature below 920° C. so as to not be overlapping with "at least 920° C." in an obvious way, such as, for example, 918° C., 917° C., 916° C., 915° C., 910° C. or other temperatures in the same range. Similarly, "at least 920° C." may be limited to an upper limit of 999° C. or such other temperature below 1000° C. so as to not be overlapping with "at least 1000° C." in an obvious way, such as, for example, 998° C., 997° C., 996° C., 995° C., 990° C. or other temperatures in the same range. Similarly, "at least 30 minutes" may be limited to 59 minutes, or such other time less than one hour as to not overlap in an obvious way, such as, for example, 58 minutes, 57 minutes, 56 minutes, 55 minutes, 50 minutes, or other times in the same range. In item 6, "at least two hours" may be limited to 23 hours and 59 minutes, or such other time less than 24 hours as to not overlap in an obvious way, such as, for example, 23 hours and 58 minutes, 23 hours and 57 minutes, 23 hours and 50 minutes or other times in the same range. Similar limitations are placed on other groups of contiguous (but non-overlapping) ranges of temperatures or times elsewhere herein.

The intent of this paragraph is to provide support for ranges that are close together, yet not overlapping, and not obvious in view of one another, in order to distinguish them in such a way as to avoid the application of the Federal Circuit case Titanium Metals.

Item 7: The method of producing a modified manganese copper chromite based pigment of item 6, wherein the extrapolated CTE of the modified pigment is less than $94×10^{-7}/°$ C.

Item 8: A method of producing a copper chromite based pigment comprising:
  providing precursor materials, such that when fired, form a copper chromite spinel structure
  providing oxides (or other suitable sources as disclosed elsewhere herein) of metals desired to intentionally modify the manganese copper chromite spinel structure, the metals selected from the group consisting of Mg, Fe, Zn, Al, Sb, and Ca.
  heating the pigment at 800-1050° C. for 1 to 50 hours, or 6-50, or 8-50, or 10-50 or 15-40 hours.

Item 9: A method of designing a range of copper chromite based pigments exhibiting a range of CTEs, comprising producing a series of pigments having the structure $A_aCu_b$-$Mn_cCr_dO_4$, wherein A is at least one metal selected from the group consisting of Al, Mg, Zn, Ti, Co, Ni, Sb, and Ca, and wherein $a+b+c+d$ is about 3, wherein the range of pigments provides a tunable CTE based on the identity of the at least one metal A and the value of subscript a, which is varied across the series of pigments.

Item 10: A method of designing a series of $Cu_xMn_yCr_2$ oxide pigments comprising synthesizing a series of $Cu_xM$-$n_yCr_z$ pigments wherein x is varied from unity to zero, wherein z is held constant, and wherein a reduction in Cu content results in a reduction in CTE of the pigment.

Pigment processing. The final mixed spinels are formed by combining and calcining appropriate ratios of reactive compounds, usually fine-sized metal oxides or salts that contain the metals of interest. Fine-sized means particles in the range of 1 nm to 10 microns, or 10 nm to 1 micron or 50 nm to 500 nm or other values in between the foregoing ranges. For example, carbonates, nitrates, oxalates, hydroxides, fluorides, sulfides, sulfates, conjugate bases of fatty acids (metal soaps), organometallics (such as alkoxides, ethoxides, methoxides, propoxides, etc.), which may include one or more of the metals (or metalloids) of concern, namely any of Mg, Ca, Zn, Al, Fe, Sc, Ti, V, Co, Ni, Zr, Hf, Nb, Ta, Ga, In, Ge, Se, Te, Mo, and W, or any combination of the foregoing. The preceding sentence is intended to be read as disclosing every possible combination of named metal or metalloid with every anion listed. The mixtures are calcined at 500-1500° C., preferably 700-1200° C., more preferably 750-1000° C., with soak times at or near the maximum temperature of 1-10000 minutes, preferably 20-1600 minutes, more preferably 30-600 minutes, and milled to a desired particle size, for example 0.1-10 microns. Most preferably, the calcining is done at 800-1000° C. for 30-480 minutes.

In the methods of the invention, the calcined pigment may be cooled, for example to room temperature at a rate of 1-50° C. per minute. The calcined pigment particles may be reduced in size by, for example, milling, to a $D_{50}$ particle size of 0.5-10 microns.

The starting particles of salts, (carbonates, nitrates, oxalates, etc.) may be of any size, but to improve reactivity and reduce processing times and costs, preferably have a $D_{90}$ particle size of less than 20 microns, more preferably less than 10 microns, still more preferably less than 6 microns, and even more preferably less than 5 microns.

In certain embodiments, one or more mineralizers can be added in the amount of 0.01-10, preferably 0.01-5 wt % of the raw mixture to help forming the desired spinel, for example, NaCl, LiF, $Na_2SiF_6$, $Na_3AlF_6$, KCl, $NH_4Cl$, $BaF_2$, $CaF_2$, $H_3BO_3$, and others.

Applications. The pigments of the invention may be used to impart color to paints (and other coatings), curable coatings (such as radiation curable), inks, plastics, rubbers, ceramics, enamels, and glasses. Of special interest is the decoration of automotive windshields, sidelights and backlights to protect the underlying adhesive or for buss bar and conductive circuit hiding.

Pigment Production Process:

(1) Batch metal oxides (or precursors that form metal oxides upon thermal treatment, including, but not limited to hydroxides, carbonates, nitrates, and alkoxides) of appropriate fine sizes and in appropriate proportions to form the desired stoichiometry.

(2) Form a relatively intimate, homogeneous blend of the raw materials by utilizing one or more blending processes, such as blending in a Littleford mixer followed by processing through a micropulverizer/hammer mill.

(3) Calcine or thermally treat in a furnace or other device, including, but not limited to rotary tube, tunnel, shuttle, or microwave furnace.

(4) Mill and/or deagglomerate to an appropriate mean size or particle size distribution in equipment such as a ball mill, attritor mill, pulverizer/hammer mill, jet mill, or fluid-bed jet mill.

Examples. The following examples illustrate, but do not limit, the scope of the invention.

The pigment compositions in Tables 1-4 were synthesized by solid state reaction of metal oxide components. The components were batched, mixed in a Waring blender, and fired in fireclay crucibles.

Glass enamel expansion bars were batched at 20 wt % pigment and 80 wt % E-8039 glass powder. The blended powders were compacted in a rectangular die on a hydraulic press and fired on a bed of alumina powder to form an enamel bar, using a 1 hour soak at 570° C. followed by a 1 hour anneal at 420° C. The fired bars were cut to 2" lengths and their thermal expansion curves were measured on an Orton dilatometer. The CTEs were calculated from the data over the 100-300° C. temperature range.

A standard Black 28 ($CuCr_2O_4$) pigment, K393-2, has an extrapolated CTE of $109 \times 10^{-7}$, whereas several modified CuMnCr structures have CTEs less than $95 \times 10^{-7}$, while others have CTEs less than $85 \times 10^{-7}$ as noted in Table 1. Extrapolated CTEs are approximations to the CTEs of the pigment. They are determined by measuring the CTEs of annealed enamel expansion bars at different pigment levels, and extrapolating the least squares line to the 100% pigment level. These results clearly show a significant impact from the formula modifications.

TABLE 1

Effect of Secondary Modifiers on Extrapolated CTE's

| Pigment | Extrapolated CTE (×1E7) |
| --- | --- |
| K393-2 Reference ($CuCr_2O_4$) | 109 |
| $Zn_{.2}Cu_{.5}Mn_{.6}Cr_{1.7}$ | 91 |
| $Zn_{.4}Cu_{.3}Mn_{.6}Cr_{1.7}$ | 83 |
| $Mg_{.2}Cu_{.5}Mn_{.6}Cr_{1.7}$ | 84 |

While Table 1 showed the impact of the secondary modifiers of this invention on the CTEs of the pigment, Table 2 demonstrates the translation of the beneficial impact of these formula modifications to the CTEs of the enamels. The 20% pigment loading represents a typical loading for automotive glass enamels, so the reduced CTEs are of direct impact and benefit to one of the most common applications. The reduced CTEs obtained are expected to reduce the stress created at the enamel-substrate interface upon the post-fire cooling.

TABLE 2

Effect of Secondary Modifiers on CTEs of 20% pigmented enamel expansion bars using E-8039 frit.
Formula: $A_{0.5}Mn_{1.0}Cr_{1.5}O_4$

| A | CTE (×10$^{-7}$) | A | CTE (×10$^{-7}$) |
| --- | --- | --- | --- |
| Cu | 93.1 | Co | 85.6 |
| Zn | 86.9 | Ni | 87.8 |
| Mg | 86.8 | Zr | 84.3 |
| Al | 90.4 | Nb | 86.8 |
| Sb | 85.9 | Y | 86.8 |
| W | 88.3 | | |

Table 3 presents color and stress data from enamel coated substrates, and enamel expansion bar CTE data (20 wt % pigment in E-8039 glass powder). The trials include examples of pigments containing secondary modifiers. Thus far, the modifiers Mg, Zn, Al, Ti, Sb, and Fe have been shown to lower the CTE. One hypothesis is that the secondary modifiers enhance the formation of a more homogenized structure and help the various metal cations rearrange into their preferred A and B spinel sites, which in turn lowers the CTEs. This hypothesis is further supported by the general observation of narrower peaks in the XRD spectra, indicative of more homogeneous crystallites. It is important to realize that not only can the CTE be lowered, but important changes to the physical properties could be taking place such as strength, acid resistance, and color improvement, based on application. All the trials containing secondary modifiers in Table 3 exhibited significantly darker enamel coatings than the reference sample, as noted from the lower L* values, and tended to show reduced stress at the enamel-substrate interface.

TABLE 3

Effect of Secondary Modifiers on Color, CTE (×10$^{-7}$) and Stress (in PSI), and Expansion Bars using frit E-8039.

| Pigment Trial | Composition | L* | a* | b* | Stress | CTE |
| --- | --- | --- | --- | --- | --- | --- |
| comparative | E-8039 glass powder (no pigment) | | | | | 98.5 |
| comparative | K393-2 ($CuCr_2O_4$) | | | | | 97.0 |
| A0 (comparative) | P9-51 reference (CuMnCr) | 5.0 | −1.3 | 0.5 | 63 | 94.9 |
| A1 | $Zn_{.4}Cu_{.3}Mn_{0.6}Cr_{1.7}$ | 3.6 | −0.8 | 0.5 | 34 | 92.6 |
| A2 | $Al_{.2}Cu_{.5}Mn_{1.0}Cr_{1.3}$ | 3.2 | −0.7 | 0.6 | 32 | 93.2 |
| A3 | $Fe_{.2}Cu_{.5}Mn_{0.8}Cr_{1.5}$ | 3.2 | −0.7 | 1.0 | 32 | 92.0 |
| A4 | $Mg_{.2}Cu_{.5}Mn_{0.6}Cr_{1.7}$ | 3.4 | −1.0 | 0.4 | 32 | 92.5 |
| A6 | $Al_{.2}Cu_{.5}Mn_{0.8}Cr_{1.5}$ | 3.1 | −0.8 | 0.5 | 64 | 93.0 |

Control of Synthesis Times and Temperatures. The second method found to make black spinel pigments for reduced CTE enamels was higher synthesis temperatures and longer soak times. A synthesis study was created for $Cu_{0.6}Mn_{0.7}Cr_{1.7}$ in which the pigment was fired at 820° C. for 2 hours (typical processing conditions for Black28 pigments); 820° C. for 24 hours; 920° C. for 2 hours and 1020° C. for 2 hours. The results in Table 4 demonstrate that both soak time and temperature can be increased for some pigments to effect CTE reduction. This suggests that the pigment was not fully reacted and homogeneous with the preferred site occupancies until it received a higher firing temperature or a longer soak. The FIGURE shows that the XRD peak width correlated with the CTE data, and in the case of the 1020° C. fire, the peaks were narrow enough to see the Kα1 Kα2 peak separation. The peak widths (full width at half-maximum height—FWHM) given in Table 4 demonstrate the increased homogeneity with increased heat work. The peak widths were determined after subtracting out the Kα2 fraction to provide an apples to apples comparison. The broader peaks are probably due to the presence of CuO rich particles, $MnO_x$ rich particles, and/or $Cr_2O_3$ rich particles which have slightly different lattice constants, and hence slightly different peak positions. This again suggests that better homogeneity and site occupancy may play an important role. This also suggests that the secondary modifiers cited previously help lower the CTE by catalyzing the reaction to completion without using increased firing temperatures.

TABLE 4

The Effect of Synthesis Temperature and Soak Time on the CTE of 20% pigmented enamel expansion bars using frit E-8039.

| Trial | Composition | Temp (C.) | Soak (Hrs) | CTE ($\times 10^{-7}$) | (4 4 0) Kα1 FWHM (2θ) |
|---|---|---|---|---|---|
| 74A1 | $Cu_{.6}Mn_{.7}Cr_{1.7}$ | 820 | 2 | 95.1 | 0.39 |
| 74A2 | $Cu_{.6}Mn_{.7}Cr_{1.7}$ | 820 | 24 | 90.7 | 0.23 |
| 74A3 | $Cu_{.6}Mn_{.7}Cr_{1.7}$ | 920 | 2 | 91.0 | 0.26 |
| 74A4 | $Cu_{.6}Mn_{.7}Cr_{1.7}$ | 1020 | 2 | 90.3 | 0.13 |

Control of Core Pigment Composition. The third method the inventors found to make black spinel pigments for reduced CTE enamels was control of the CuMnCr crystal structure—the pigment's core composition. Noting that two endpoints of the $(Cu,Mn,Cr)_3O_4$ solid solution are $CuCr_2O_4$ and $MnCr_2O_4$, a study was conducted to determine their effect on the expansion bar CTEs. The results in Table 5 show that a $MnCr_2O_4$ pigment gave a significantly lower CTE enamel than its $CuCr_2O_4$ counterpart. Therefore, reduction of the Cu level in the pigment helps reduce the enamel CTE. Without being bound by theory, the inventors believe this may be the result of a significant Jahn-Teller (JT) distortion from the Cu(II) component since JT distortion is typically exhibited by Cu(II) ions in either tetrahedral or octahedral sites, the two environments present in spinels. Likewise, the CTE improvement observed from substituting secondary modifiers for Cu may also be partially related to reduction of the JT distortion issue. Note that reduction of the Cu level to $<Cu_{0.3}$ in the spinel formula typically results in brown pigments, so it cannot be completely removed at this time.

TABLE 5

The Effect of Core Composition on CTE of 20% pigmented enamel expansion bars using frit E-8039

| PigmentTrial | Composition | CTE ($\times 10^{-7}$) |
|---|---|---|
| 58A1 | $Cu_{1.0}Cr_{2.0}O_4$ | 98.4 |
| 58A2 | $Cu_{1.5}Cr_{1.5}O_4$ | 101.8 |
| 58A3 | $Mn_{1.0}Cr_{2.0}O_4$ | 90.4 |
| 58A4 | $Mn_{1.5}Cr_{1.5}O_4$ | 90.2 |

The inventors have observed that pigments are typically not fired at higher temperatures than necessary; typical firing temperatures being less than 850° C., and soak times at the desired maximum temperature seldom exceed 4 hours for pigments. In the case of $CuCr_2O_4$ stoichiometry, an increased time or temperature results in the formation of a large amount of $CuCrO_2$, a Cu(I) compound that is controlled to be a minor fraction of Ferro's K393-2 pigment. Therefore, these more extreme conditions may only be viable for the Mn-containing versions.

The invention claimed is:

1. A modified copper chromite black spinel pigment comprising a copper chromite based solid solution having a formula $A_aCu_bMn_cCr_dO_4$, wherein A is at least one metal selected from the group consisting of Al, Ti, Co, Ni, Zn, Zr, Nb, Y, Sb, and Ca, and wherein $2.6 \leq a+b+c+d \leq 3.2$, wherein none of a, b, and d is zero.

2. The modified copper chromite black spinel pigment of claim 1 wherein the modified copper chromite black spinel pigment exhibits a reduced extrapolated CTE relative to a $Cu_xMn_yCr_zO4$ where $x+y+z=3$.

3. The modified copper chromite black spinel pigment of claim 1 wherein a subscript "a" ranges from 0.01 to 0.60 and an extrapolated CTE is less than $94 \times 10^{-7}/°$ C.

4. The modified copper chromite black spinel pigment of claim 1 wherein the subscript "a" ranges from 0.04 to 0.4.

5. The modified copper chromite black spinel pigment of claim 1 wherein the pigment has X-ray powder diffraction peaks wherein the (4 4 0) reflection has a full width at half maximum height of 2θ<0.30° after subtraction of the Cu Kα2 component.

6. The modified copper chromite black spinel pigment of claim 1, wherein a subscript "b"≤0.5.

7. The modified copper chromite black spinel pigment of claim 1, wherein 0.3≤b≤0.5.

8. A glass or ceramic substrate bearing an enamel comprising the modified copper chromite black spinel pigment of claim 1.

9. An enamel comprising the modified copper chromite black spinel pigment of claim 1.

10. The modified copper chromite black spinel pigment of claim 1 wherein c is not zero, wherein the pigment provides a tunable CTE based on the identity of the at least one metal A and the value of subscript a, which is varied across the series of pigments.

11. The modified copper chromite black spinel pigment of claim 1 wherein c is not zero, and the full width at half maximum XRD peak for the (4 4 0) reflection is 2θ<0.3° and an extrapolated CTE is less than $94 \times 10^{-7}/°$ C.

12. The modified copper chromite black spinel pigment of claim 1 wherein b≤0.5 and the extrapolated CTE is less than $94 \times 10^{-7}/°$ C.

13. A method of producing a modified copper chromite black spinel pigment, comprising:
    providing precursor materials to form the formula $A_aCu_b$-$Mn_cCr_dO_4$ of claim 1, and
    heating the precursor materials to at least 820° C., to form the modified copper chromite black spinel pigment, wherein the modified copper chromite black spinel pigment exhibits a reduced extrapolated CTE relative to the modified copper chromite pigment heated at below 820° C. for less than 2 hours.

14. The method of claim 13 wherein the precursor materials are heated to one of at least 850° C. for at least 2 hours, at least 920° C. for at least 1 hour, and at least 1000° C. for at least 20 minutes, to form a modified copper chromite black spinel pigment.

15. A pigment made by the method of claim 13 wherein the XRD peak width at half height of the (4 4 0) reflection is 2θ≤0.30° after subtraction of the Cu Kα2 component.

16. A method of producing a manganese copper chromite based pigment comprising:
   providing precursor materials, such that when fired, form a modified manganese copper chromite spinel structure,
   providing oxides of at least one metal desired to modify the manganese copper chromite spinel structure, the at least one metal selected from the group consisting of Al, Ti, Co, Ni, Zn, Zr, Nb, Y, Sb, and Ca, and
   firing at 800-1050° C. for 0.5 to 50 hours,
   wherein the CTE of the pigmented enamel is less than it would be without modifying the manganese copper chromite spinel structure.

17. The method of claim 16, wherein the pigment produced thereby exhibits a CTE of a 20% pigmented enamel expansion bar of less than $92 \times 10^{-7}/°$ C.

18. The method of producing a copper chromite based pigment of claim 16, wherein the pigment is heated to either at least 850° C. for at least 2 hours or at least 920° C. for at least 1 hour.

* * * * *